(12) United States Patent
Abrahams et al.

(10) Patent No.: US 10,839,796 B2
(45) Date of Patent: Nov. 17, 2020

(54) DYNAMIC PERSONALIZED MULTI-TURN INTERACTION OF COGNITIVE MODELS

(71) Applicant: INTERNATIONAL BUSINESS MACHINES CORPORATION, Armonk, NY (US)

(72) Inventors: Faried Abrahams, Laytonsville, MD (US); Lalit Agarwalla, Bangalore (IN); Gandhi Sivakumar, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/843,373

(22) Filed: Dec. 15, 2017

(65) Prior Publication Data

US 2019/0019507 A1   Jan. 17, 2019

Related U.S. Application Data

(63) Continuation of application No. 15/650,301, filed on Jul. 14, 2017.

(51) Int. Cl.
*G10L 15/00* (2013.01)
*G10L 17/00* (2013.01)
(Continued)

(52) U.S. Cl.
CPC .......... *G10L 15/22* (2013.01); *G06F 16/3329* (2019.01); *G06N 5/00* (2013.01);
(Continued)

(58) Field of Classification Search
CPC ......... G10L 15/22; G10L 21/06; G10L 15/26; G10L 15/1822; G10L 15/183; G10L 13/08; G10L 15/265; G10L 2015/223; G10L 15/08; G10L 2015/228; G10L 15/065; G10L 17/10; G10L 15/06; G10L 15/063; G10L 15/24; G06F 17/2785; G06F 3/167; G06F 17/2765; G06F 17/20; G06F 17/274; G06F 17/2775; G06F 2203/0381; G06F 11/3065; G06F 17/21; G06F 17/27; G06F 17/2818; H04M 2250/74; H04M 2201/40;
(Continued)

(56) References Cited

U.S. PATENT DOCUMENTS 6,721,706 B1   4/2004   Strubbe et al.
7,600,017 B2   10/2009  Holtzman et al.
(Continued)

OTHER PUBLICATIONS

Anonymously, "Method and Apparatus for Context Based Machine Learning Model", http://ip.com/IPCOM/000247499D; Sep. 10, 2016; 4 pages.
(Continued)

*Primary Examiner* — Michael Ortiz-Sanchez
(74) *Attorney, Agent, or Firm* — Scott Dobson; Andrew D. Wright; Roberts Calderon Safran & Cole, P.C.

(57) ABSTRACT

Multi-turn conversation systems that are personalized to a user based on insights derived from big data are described. A method includes: receiving, by a computer device, input from a user; obtaining, by the computer device, insights about the user; generating, by the computer device, a response based on the insights and the input; and outputting, by the computer device, the response.

20 Claims, 3 Drawing Sheets

(51) Int. Cl.
  *G10L 15/22* (2006.01)
  *G06F 16/332* (2019.01)
  *G06N 5/00* (2006.01)
  *G10L 15/26* (2006.01)
  *G10L 17/26* (2013.01)
(52) U.S. Cl.
  CPC .............. *G10L 15/26* (2013.01); *G10L 17/26* (2013.01); *G10L 2015/225* (2013.01); *G10L 2015/226* (2013.01); *G10L 2015/228* (2013.01)
(58) Field of Classification Search
  CPC . H04M 3/4936; G06Q 50/01; G06Q 30/0241; Y10S 707/99933; Y10S 707/99935
  See application file for complete search history.

(56) References Cited

U.S. PATENT DOCUMENTS

| | | | |
|---|---|---|---|
| 8,112,275 B2* | 2/2012 | Kennewick | G10L 15/22 704/240 |
| 8,620,659 B2 | 12/2013 | DiCristo et al. | |
| 8,886,536 B2 | 11/2014 | Freeman et al. | |
| 9,218,819 B1* | 12/2015 | Stekkelpak | G10L 15/22 |
| 9,465,833 B2 | 10/2016 | Aravamudan et al. | |
| 10,089,072 B2 | 10/2018 | Piersol et al. | |
| 10,223,066 B2 | 3/2019 | Martel et al. | |
| 2003/0018659 A1* | 1/2003 | Fuks | G06F 16/3325 715/230 |
| 2007/0033005 A1* | 2/2007 | Cristo | G06F 17/279 704/9 |
| 2007/0038436 A1* | 2/2007 | Cristo | G06F 17/273 704/9 |
| 2007/0050191 A1* | 3/2007 | Weider | G06F 17/30864 704/275 |
| 2007/0219984 A1* | 9/2007 | Aravamudan | G06F 16/686 |
| 2010/0023320 A1 | 1/2010 | Di Cristo et al. | |
| 2010/0223581 A1 | 9/2010 | Manolescu et al. | |
| 2012/0016678 A1* | 1/2012 | Gruber | G06F 17/3087 704/275 |
| 2012/0253789 A1* | 10/2012 | Heck | G10L 15/1822 704/9 |
| 2012/0253790 A1* | 10/2012 | Heck | G06F 17/30867 704/9 |
| 2012/0265528 A1* | 10/2012 | Gruber | G10L 15/18 704/235 |
| 2013/0346077 A1* | 12/2013 | Mengibar | G10L 15/265 704/235 |
| 2014/0278343 A1* | 9/2014 | Tran | G06F 17/2785 704/2 |
| 2015/0089409 A1 | 3/2015 | Asseily et al. | |
| 2015/0106096 A1* | 4/2015 | Toopran | G10L 15/193 704/244 |
| 2015/0370787 A1* | 12/2015 | Akbacak | G06F 17/2836 704/2 |
| 2016/0085854 A1 | 3/2016 | Blackford et al. | |
| 2016/0225030 A1 | 8/2016 | Iyer et al. | |
| 2016/0267187 A1* | 9/2016 | Gabara | G06F 16/9535 |
| 2016/0293034 A1* | 10/2016 | Agarwalla | G06N 99/005 |
| 2016/0321259 A1* | 11/2016 | Bastian | G06Q 50/01 |
| 2016/0342683 A1 | 11/2016 | Lim et al. | |
| 2017/0068423 A1 | 3/2017 | Napolitano et al. | |
| 2017/0250931 A1* | 8/2017 | Ioannou | H04L 67/18 |
| 2018/0165582 A1 | 6/2018 | Cha | |
| 2018/0189857 A1 | 7/2018 | Wu et al. | |
| 2018/0213284 A1 | 7/2018 | Shekhar et al. | |
| 2018/0349820 A1 | 12/2018 | Goyal et al. | |
| 2019/0095444 A1* | 3/2019 | Payne | G06F 40/284 |
| 2019/0132265 A1* | 5/2019 | Nowak-Przygodzki | H04L 51/02 |

OTHER PUBLICATIONS

Anonymously, "Method and Apparatus for Trust, Vicinity, Natural Language Processing Based Collaboration Leveraging Insights-Based Cognitive Models", http://ip.com/IPCOM/000241376D; Apr. 21, 2015; 5 pages.

Anonymously, "Multile device input coordination based on application, user and grouping context", http://ip.com/IPCOM/000238290D; Aug. 14, 2014; 4 pages.

Kelly et al., "A User Modeling System for Personalized Interaction and Tailored Retrieval in Interactive IR", Proceedings of Annual Conference of the American Society for Information Science and Technology (ASIST '02), http://ils.unc.edu/~dianek/kelly-asist02.pdf, 2002; 10 pages.

List of IBM Patents or Patent Applications Treated as Related 1 page.

Specification "Dynamic Personalized Multi-Turn Interaction of Cognitive Models" and Drawings in U.S. Appl. No. 15/650,301, filed Jul. 14, 2017, 32 pages.

Office Action from U.S. Appl. No. 15/650,301 dated Jan. 10, 2019; 20 pages.

Office Action from U.S. Appl. No. 15/650,301 dated Nov. 15, 2019, 19 pages.

Office Action issued in U.S. Appl. No. 15/650,301 dated May 6, 2020, 21 pages.

Final Office Action from U.S. Appl. No. 15/650,301 dated Jul. 9, 2019, 17 pages.

Notice of Allowance in U.S. Application No. 15/650,301 dated Jul. 22, 2020, 9 pages.

\* cited by examiner

DYNAMIC PERSONALIZED MULTI-TURN INTERACTION OF COGNITIVE MODELS

BACKGROUND

The present invention generally relates to computer-based conversation systems and, more particularly, to multi-turn conversation systems that are personalized to a user based on insights derived from big data.

Cognitive modeling is an area of computer science that deals with simulating human problem solving and mental task processes in a computerized model. Such a model can be used to simulate or predict human behavior or performance on tasks similar to the ones modeled. Cognitive models (sometimes referred to as cognitive entities) are sometimes used in computer based conversation systems such as chat-bots and question answering systems. Cognitive models are aimed to remember past, interact with humans, continuously learn and refine responses for the future. The interactions provided by cognitive models are static.

SUMMARY

In a first aspect of the invention, there is a method for providing responses to user input. The method includes: receiving, by a computer device, input from a user; obtaining, by the computer device, insights about the user; generating, by the computer device, a response based on the insights and the input; and outputting, by the computer device, the response.

In another aspect of the invention, there is a computer-based conversation system for interacting with a user. The system includes: a CPU, a computer readable memory, and a computer readable storage medium associated with a computer device; and program instructions defining a statement and question framer that is configured to: obtain insights about a user from a big data engine; and generate a response to an input from the user based on the insights and the input. The program instructions are stored on the computer readable storage medium for execution by the CPU via the computer readable memory.

In another aspect of the invention, there is a computer program product for generating conversational responses to user input. The computer program product comprises a computer readable storage medium having program instructions embodied therewith. The program instructions are executable by a computer device to cause the computer device to: receive an input from a user; determine context data based on the input; obtain additional data including time data, location data, and external data; obtain insights about the user from a big data engine, the insights comprising likes of the user, dislikes of the user, and opinions of the user; generate a response to the input based on the context data, the insights, and the additional data; and output the response.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
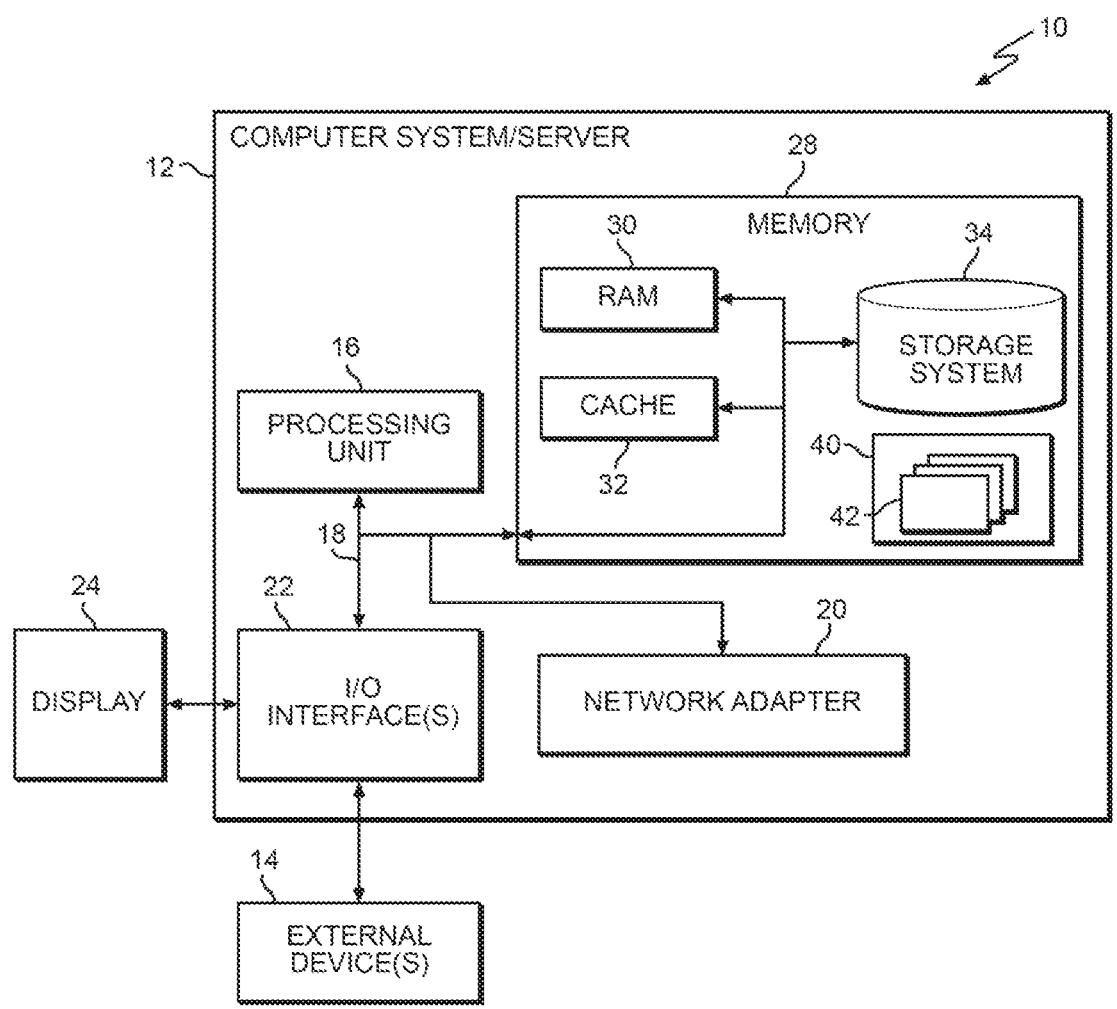
FIG. 1 depicts a computing infrastructure according to an embodiment of the present invention.

The present invention generally relates to computer-based conversation systems and, more particularly, to multi-turn conversation systems that are personalized to a user based on insights derived from big data. Aspects of the invention manifest a cognitive model via a big data platform. In embodiments, insights about a user are obtained from a big data platform, and a cognitive model uses the insights to generate a personalized interaction with the user. For example, a computer-based conversation system may dynamically frame questions and statements to a user based on big data derived insights such as likes, dislikes, and opinions of the user. In this manner, implementations of the invention interact with a user based on the user's determined behavior pattern (e.g., likes, dislikes, and opinions) to provide a dynamic and personalized natural language experience for the user.

In embodiments, the system is a multi-turn conversation system (also called a multi-turn dialog system) that can provide a output to the user in the form of either a statement or a question. In accordance with aspects of the invention, the system is configured to provide an output to a user in either a pull scenario or a push scenario. In a pull scenario, the system provides an output in response to an input from the user. In a push scenario, the system provides a spontaneous output that is not directly responding to an input from a user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
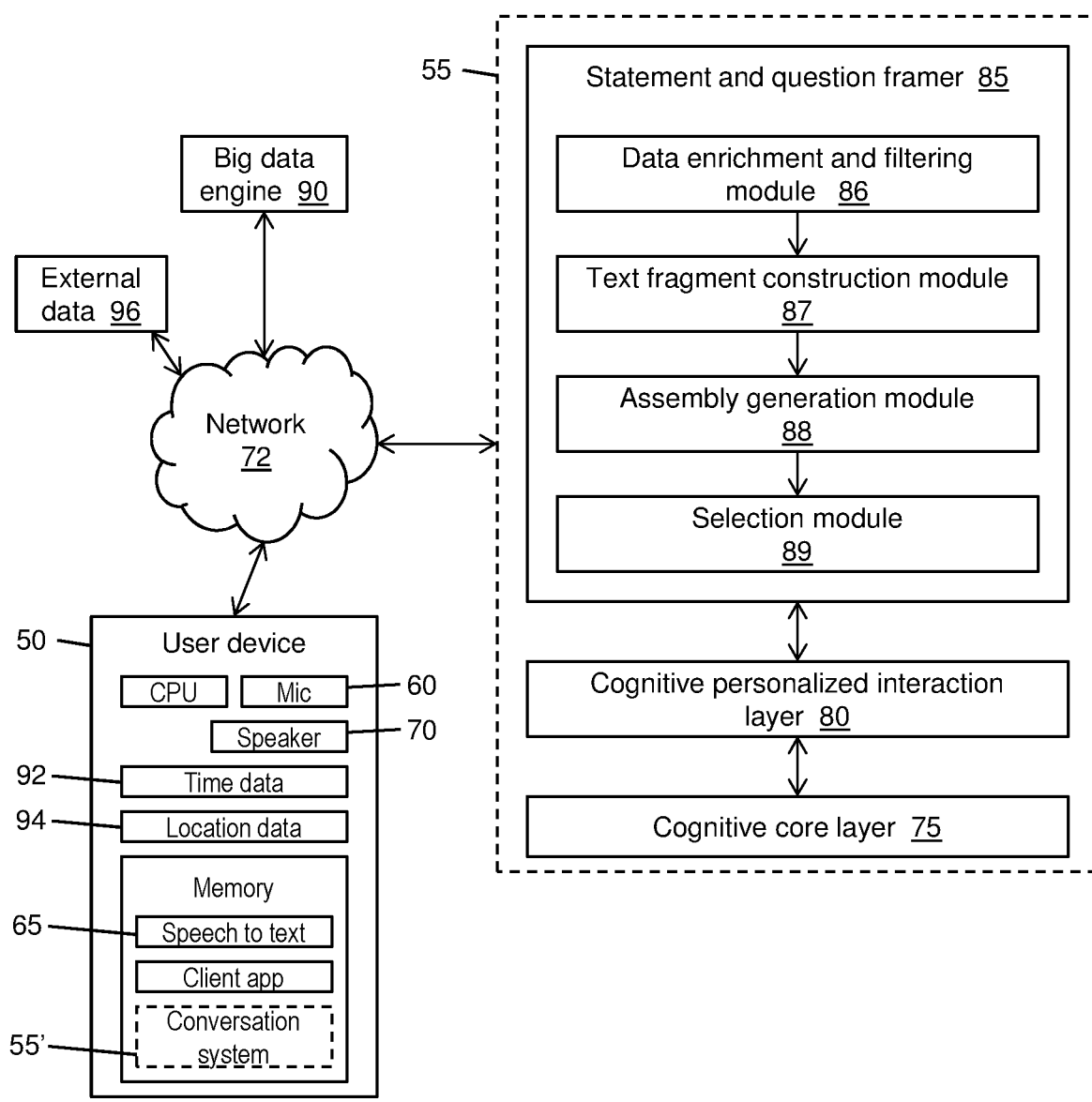
FIG. 2 shows an exemplary environment in accordance with aspects of the invention.

FIG. 2 shows a block diagram of an exemplary environment in accordance with aspects of the invention. In embodiments, the environment includes a user device 50 and a conversation system 55. The user device 50 may be a computer system such as computer system 12 of FIG. 1, and may be embodied as a smartphone, tablet computer, laptop computer, desktop computer, or an appliance. In embodiments, the user device 50 is configured to receive an input from a user in the form of a statement or a question, and to pass that input to the conversation system 55. For example, the user device 50 may include a microphone 60 and an application program 65 that converts audio signals (e.g., speech) detected at the microphone 60 to text, and the user device 50 may pass the text to the conversation system 55. In this manner, a human user may speak an input (e.g., a statement or a question) to the user device 50, and the user device 50 may receive the input and pass the input to the conversation system 55 in a format that is usable by the conversation system.

According to aspects of the invention, the conversation system 55 is configured to receive the input from the user device 50 and generate a response based on both the input and determined insights about the user. In implementations, the conversation system 55 provides the response to the user device 50, and the user device 50 outputs the response to the user. For example, the user device 50 may comprise a speaker 70, and the user device 50 may output the response as an audio signal (e.g., a spoke statement or question) via the speaker 70. In this manner, the human user may speak an input (e.g., a statement or a question) to the user device 50, and the user device 50 may emit an audible response in response to the user's spoken input.

Aspects of the invention are not limited to spoken (e.g., audible) inputs and outputs. For example, the user device 50 may receive the user input in the form of text. For example, a user may use a device such as a keyboard, mouse, or touchscreen to type a text input to the user device 50. In this implementation, the user device 50 may provide the output as text displayed on a visual display of the user device 50.

In an embodiment, the user device 50 and the conversation system 55 are separate computer devices. For example, the user device 50 may run a client application that is programmed to interface with the conversation system 55. In this exemplary implementation, the conversation system 55 may comprise one or more program modules that reside at one or more computer devices (such as computer system 12 of FIG. 1) that are located remotely relative to the user device 50, such as at one or more servers located in a network 72 (e.g., the Internet). In another embodiment, the conversation system 55' is included in the user device 50. For example, the conversation system 55' may comprise one or more program modules that are stored in the memory of the user device 50 and that are executed by the processor of the user device 50.

Still referring to FIG. 2, in embodiments the conversation system 55 comprises a cognitive core layer 75, a cognitive personalized interaction layer 80, and a statement and question framer 85. The layers 75, 80 each may comprise one or more program modules (e.g., program modules 42 of FIG. 1) that are configured to perform one or more processes described herein.

In accordance with aspects of the invention, the cognitive core layer 75 is a part of a cognitive model that is configured to manage user interactions. In embodiments, the cognitive core layer 75 receives input from, and provides output to, the user device 50.

The cognitive personalized interaction layer 80 interfaces with the cognitive core layer 75 and the statement and question framer 85. In embodiments, the cognitive personalized interaction layer 80 is configured to monitor an ongoing conversation with the user, determine parameters based on the ongoing conversation, and send the parameters to the statement and question framer 85. The parameters may include contextual information obtained via context analysis of the ongoing conversation. The parameters may include a type of output to be generated. The type of output may be one of push and pull. The type of output may also be one of statement and question.

In one exemplary aspect, the cognitive personalized interaction layer 80 is configured to determine when to push an output (e.g., a question or a statement) to a user based on a contextual analysis of the ongoing conversation. For example, the cognitive personalized interaction layer 80 may be configured to use context analysis to determine a level of emotion and/or urgency in a conversation, and to push a question to the user when the level of emotion and/or urgency is detected and when the user has been silent for more than a predefined amount of time. In another exemplary aspect, the cognitive personalized interaction layer 80 may be configured to use context analysis to determine emotion and/or urgency in a conversation, and to frame responses that are aligned with the determined emotion and/or urgency.

In another exemplary aspect, the cognitive personalized interaction layer 80 is configured to keep track of and provide responses to questions that have been previously asked but not yet answered. For example, in an ongoing conversation it is possible for a user's question to go unanswered while the user moves on to another topic. This is possible, for example, when a user asks plural questions and/or when a user interrupts a response with a new statement or question before the response is fully given (e.g., output in its entirety). In embodiments, the cognitive personalized interaction layer 80 is configured to keep track of such unanswered questions, and to provide a response to the unanswered questions when there is a lull in the conversation.

In another exemplary aspect, the cognitive personalized interaction layer 80 is configured to implement a multi-turn conversation. In embodiments, the cognitive personalized interaction layer 80 is configured to use context analysis of the ongoing conversation to determine whether to output a statement or a question in response to an input from the user.

With continued reference to FIG. 2, the statement and question framer 85 is configured to generate the output that is provided by the conversation system 55. In embodiments, the statement and question framer 85 receives an indication of a type of output (e.g., push or pull, statement or question) from the cognitive personalized interaction layer 80. In the case of a pull output (i.e., where the system is responding to an input from the user), the statement and question framer 85 also receives the input (e.g., the user question) from the cognitive personalized interaction layer 80.

In accordance with aspects of the invention, the statement and question framer 85 interfaces with a big data engine 90 to obtain insights about the user, and generates the output based on the insights. The big data engine 90 (also referred to as a big data platform) obtains and analyzes data from plural disparate sources including but not limited to: social media sources (user social media posts, comments, follows, likes, dislikes, etc.); social influence forums (e.g., user comments at online blogs, user comments in online forums, user reviews posted online, etc.); activity-generated data (e.g., computer and mobile device log files including web site tracking information, application logs, sensor data such as check-ins and other location tracking, data generated by the processors found within vehicles, video games, cable boxes, household appliances, etc.); Software as a Service (SaaS) and cloud applications; transactions (e.g., business, retail, etc.); emails; social media; sensors; external feeds; RFID (radio frequency identification) scans or POS (point of sale) data; free-form text; geospatial data; audio; still images and videos. Big data, by definition, involves data sets that are so large or complex that traditional data processing application software is incapable of obtaining and analyzing the data. As such, it follows that the big data engine 90 is necessarily rooted in computer technology since the processes involved are impossible to perform without computer technology (i.e., the processes involved in obtaining and analyzing big data cannot be performed in the human mind). In embodiments, the big data engine 90 includes a plurality of computer devices (e.g., servers) arranged in a distributed network (e.g., a cloud environment).

Big data analytics may include the process of examining large data sets (e.g., big data) to uncover hidden patterns, unknown correlations, market trends, customer preferences and other useful business information. The big data engine 90 supports customizable big data analytics to obtain insights about desired topics. In accordance with aspects of the invention, the big data engine 90 uses big data analytics to determine insights about a user that is interacting with the computer-based conversation system. The insights may include, for example, likes, dislikes, and opinions of a user. Specific, non-limiting examples of user likes for a fictional user "Sam" include: Sam likes margherita pizza in winter, Sam's favorite restaurant is in Austin, Tex., Sam like convertible cars, Sam likes vacationing at the beach, and Sam likes to exercise when he is stressed. Specific, non-limiting examples of user dislikes for "Sam" include: Sam dislikes arguments, Sam does not like iced tea, and Sam does not like riding a motorcycle. Specific, non-limiting examples of user opinions for "Sam" include: Sam believes that arguments are a waste of time, Sam believes that sleeping early gives energy for the next day, Sam believes that honesty is the best policy, and Sam believes that an apple a day is healthy. These examples are merely illustrative of the types of insights that the big data engine 90 might determine for a fictional user, and are not intended to limit implementations of the invention. In practice, the big data engine 90 determines different likes, dislikes, and opinions for different users based on analyzing the big data. Moreover, the determined likes, dislikes, and opinions for any one user may change over time as more data becomes available, and the big data engine 90 periodically updates the determined likes, dislikes, and opinions for a user as new data related to that user is obtained.

In addition to insights from the big data engine 90, the statement and question framer 85 may be configured to generate the output based on additional data including at least one of: time data 92, location data 94, and external data 96. Time data 92 constitutes a date and time associated with the user that provides the input and is obtained by the conversation system 55 from the user device 50. Location data 94 constitutes a location associated with the user and is obtained by the conversation system 55 from the user device 50 (e.g., from a global positioning system of the user device 50). External data 96 may comprise any additional data that is used by the conversation system 55 for generating a response to a question, and may include data such as: weather data from a weather service; news data from a news service; traffic data from a traffic service; location data from a mapping service; Internet data obtained via automated Internet search; inventory data obtained from an enterprise database; etc. In embodiments, the conversation system 55 may access the external data 96 to obtain data to use in a response to a user question using conventional techniques. For example, the user may ask the question "what movies are playing at location ABC tonight?" and the conversation system 55 may perform an Internet search of movie theaters near location ABC to obtain data to use in a response to this question.

With continued reference to FIG. 2, in embodiments the statement and question framer 85 comprises a data enrichment and filtering module 86, a text fragment construction module 87, an assembly generation module 88, and a selection module 89. Each of the modules 86-89 may comprise one or more program modules (e.g., program modules 42 of FIG. 1) that are configured to perform one or more processes described herein.

In accordance with aspects of the invention, the data enrichment and filtering module 86 is configured to infer and generate data from data sources, and to filter the data obtained from the big data engine 90. In embodiments, the data enrichment and filtering module 86 passes an identity of the user to the big data engine 90, and the big data engine 90 provides insights associated with that user back to the data enrichment and filtering module 86. Many of the insights about a user may be irrelevant to the current input (e.g., question) or ongoing conversation. As a result, the data enrichment and filtering module 86 filters the insights obtained from the big data engine 90 by selecting only those insights that are deemed relevant to the input or ongoing conversation. The relevance of each insight may be determined using a scoring algorithm based on at least one of: topic of the conversation; time and/or date from the time data; location from the location data; and contextual analysis of the input or ongoing conversation. In embodiments, only those insights with scores higher than a threshold value may be deemed relevant. In this manner, the data enrichment and filtering module 86 filters the insights obtained from the big data engine 90. The data enrichment and filtering module 86 passes the filtered data (e.g., the relevant insights) to the text fragment construction module 87.

In accordance with aspects of the invention, the text fragment construction module 87 is configured to generate text fragments based on the filtered data from the data enrichment and filtering module 86. In embodiments, the text fragment construction module 87 uses natural language processing (NLP) techniques to generate plural short text fragments (e.g., one two or three words) based on the relevant user insights (e.g., likes, dislikes, opinions related to the user input). The text fragment construction module 87 may also utilize at least one of the time data 92, the location data 94, and the external data 96 in generating the text fragments. For example, if the response is an answer to a question asked by the user, then one or more of the text fragments may include data obtained from the external data 96 that provides an answer to the question. The text fragment construction module 87 passes the plural text fragments to the assembly generation module 88.

In accordance with aspects of the invention, the assembly generation module 88 is configured to generate plural sentences based on the plural text fragments received from the text fragment construction module 87. The assembly generation module 88 may use conventional question answering techniques to generate the plural different sentences using the plural text fragments. The assembly generation module 88 passes the plural sentences to the selection module 89.

In accordance with aspects of the invention, the selection module 89 is configured to select a single one of the plural sentences (received from the assembly generation module 88) as the output of the system, e.g., as the response to the user. In embodiments, the selection module 89 uses conventional heuristics and machine learning processes to select a single one of the plural different sentences as the output. The selection module 89 passes the selected sentence to the cognitive personalized interaction layer 80, which passes it to the cognitive core layer 80, which passes it to the user device 50, which outputs it to the user (e.g., via audio and/or video display).

In an exemplary use case, the conversation system 55 may be used as part of a human like chat-bot that automatically generates personalized responses in response to a user input. Conventional chat-bots do not utilize insights obtained from big data, and instead use static sentences when responding to a user. Aspects of the invention may be used to provide a chat-bot that is situation and history aware (more like a human) and that automatically frames sentences to provide a personalized an appropriate response to s user input.

In one example, the conversation system 55 receives an input from user "Sam" in the form of a question: "What vehicles are available from rental company ABC on this date?" The conversation system 55 accesses external data 96 to perform an Internet search at the website of rental company ABC for available rentals on the specified date. The search returns a result of a convertible car, a van, and a motorcycle all being available for rental. The conversation system 55 obtains the insights (from the big data engine 90) that Sam likes convertible cars and that Sam does not like riding motorcycles. The conversation system 55, using the statement and question framer 85, generates the following output based on the insights: "Sam, rental company ABC has a convertible car available on that date, as well as a van." The output is personalized to Sam based on the insights because it emphasizes one of Sam's likes (by mentioning the convertible car before the van) and de-emphasizes one of Sam's dislikes (e.g., by not mentioning the motorcycle that is available).

In another example, the conversation system 55 receives an input from user "Sam" in the form of a question: "What vehicles are available from rental company XYZ on this date?" The conversation system 55 accesses external data 96 to perform an Internet search at the website of rental company XYZ for available rentals on the specified date. The search returns a result of only a motorcycle being available for rental. The conversation system 55 obtains the insight (from the big data engine 90) that Sam does not like riding motorcycles. The conversation system 55, using the statement and question framer 85, generates an output based on this insight: "Sam, rental company XYZ only has a motorcycle available. Do you want me to check another rental company?" The output is personalized to Sam based on the insight that Sam does not like riding motorcycles. The output is also an example of a multi-turn conversation because the output is includes a question directed back to the user, Sam.

In another example, the cognitive personalized interaction layer 80 determines from context analysis of the conversation that Sam is stressed (e.g., using conventional context analysis techniques). The cognitive personalized interaction layer 80 passes this parameter (Sam is stressed) to the statement and question framer 85. The statement and question framer 85 uses the parameter (Sam is stressed) and the insight from the big data engine 90 (Sam likes to exercise when he is stressed), and generates the output: "Sam, you seem stressed, you should exercise." The output is personalized to Sam based on the insight that Sam likes to exercise when he is stressed. This output may be a push type of output in that it may be spontaneously provided by the system (as opposed to being in response to an input from Sam).

In another example, the conversation system 55 determines from location data 94 that Sam is in Austin, Tex. The conversation system 55 uses the location data and the insight (obtained from the big data engine 90) that Sam's favorite restaurant is in Austin, Tex., and generates the output: "Sam, are you planning on visiting your favorite restaurant tonight?" The output is personalized to Sam based on the insight that Sam's favorite restaurant is in Austin, Tex. This output may be a push type of output in that it may be spontaneously provided by the system (as opposed to being in response to an input from Sam).

In another example, the conversation system 55 determines that a previous question is currently unanswered, and generates a response such as: "Sam, I realize that we have digressed, but earlier you asked me to find the revenue from region XYZ for the third quarter of 2014 for the ABC servers. Let me get that answer for you now . . . ". The step of presenting to a previously unanswered question is based on the cognitive personalized interaction layer 80 keeping track of which questions have been answered and which have not been answered.

In another example, the conversation system 55 obtains time data 92 and determines that the current time is late at night. The conversation system 55 uses the time data 92 and the insight that Sam believes that sleeping early gives energy for the next day, and based on this the conversation system 55 generates the output: "Sam, it is time for you to go to bed." The output is personalized to Sam based on the insight that Sam believes that sleeping early gives energy for the next day.

Figure 3:
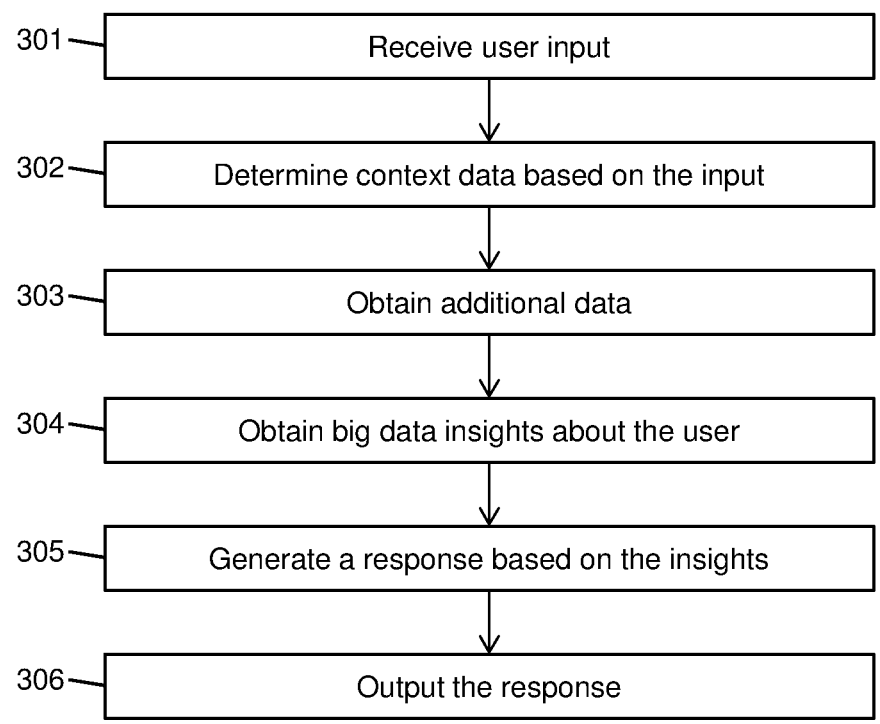
FIG. 3 shows a flowchart of an exemplary method in accordance with aspects of the invention.

FIG. 3 shows a flowchart of a method in accordance with aspects of the invention. Steps of the method of FIG. 3 may be performed in the environment illustrated in FIG. 2 and are described with reference to elements and steps described with respect to FIG. 2. The method can be used for operating a computer-based conversation system that interacts with a human user.

At step 301, a conversation system 55 receives an input from a user device 50. In embodiments, the input is spoken or typed at the user device 50 and passed from the user device to the conversation system 55. As described with respect to FIG. 2, the conversation system 55 may be running on the user device 50, or may be on one or more computer devices that are separate from the user device 50.

At step 302, the conversation system 55 determines context data based on the input. In embodiments, as described with respect to FIG. 2, one of the cognitive core layer 75 and the cognitive personalized interaction layer 80 determines the context data by performing a context analysis on the input.

At step 303, the conversation system 55 obtains additional data. In embodiments, as described with respect to FIG. 2, the additional data may include at least one of time data 92, location data 94, and external data 96.

At step 304, the conversation system 55 obtains big data insights about the user. In embodiments, as described with respect to FIG. 2, the conversation system 55 obtains insights about the user from a big data engine 90.

At step 305, the conversation system 55 generates an response based on the insights. In embodiments, as described with respect to FIG. 2, the statement and question framer 85 generates the response based on at least one insight about the user that was obtained from the big data engine 90. In addition to being based on at least one insight about the user, the response may be generated based on at least one of: the context data determined at step 302; and the additional data obtained at step 303. In embodiments, as described with respect to FIG. 2, generating the response may include: filtering the insights; constructing text fragments based on the filtered insights; generating plural sentences from the text fragments; and selecting a single one of the plural sentences as the response.

At step 306, the conversation system 55 outputs the generated response. In embodiments, as described with respect to FIG. 2, the conversation system 55 outputs the generated response to the user device 50, and the user device 50 outputs the generated response to the user via audio output and/or video output.

Aspects of the invention may be used to provide a method for providing responses to user input, the method comprising: identifying information about a user; receiving text (or spoken) input from the user; identifying current context information; and generating a response to the user based on the input and the current context information, the response being personalized for the user based on the information about the user. The information about the user may include likes and dislikes. The information about the user may comprise previous user input and associated context information. The information about the user may be identified using a big data engine.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing responses to user input, comprising:
    receiving, by a computer device, a user input in the form of an audio signal from a user;
    converting, by the computer device, the audio signal to text;
    determining, by the computer device, context data based on context analysis of the text using natural language processing;
    determining, by the computer device, to provide a statement or a question as a response to the user input based on the context data;
    sending, by the computer device, an identity of the user to a remote big data engine;
    obtaining, by the computer device, insights about the user including likes, dislikes, and opinions of the user from the remote big data engine in response to the sending the identity;
    determining, by a scoring algorithm of the computing device, relevance scores for each of the insights obtained from the remote big data engine based on relevance of each of the insights to the user input;
    filtering, by the computer device, the insights obtained from the remote big data engine based on the relevance of each of the insights to the user input, wherein the filtering produces filtered insights;
    constructing, by the computer device, text fragments based on the filtered insights;
    conducting, by the computer device, a search of a network based on the user input to obtain a result;
    dynamically generating, by the computer device, multiple personalized sentences in response to the user input based on the text fragments and the result;
    selecting one of the multiple personalized sentences as a response to the user input; and
    outputting, by the computer device, the response to the user.

2. The method of claim 1, wherein the generating the text fragments is additionally based on the determined context data.

3. The method of claim 1, further comprising obtaining, by the computer device, additional data including at least one selected from the group consisting of: time data, location data, and external data, wherein the generating the response is additionally based on the additional data.

4. The method of claim 1, wherein the response answers a question defined by the user input.

5. The method of claim 1, wherein the response includes a question to the user.

6. The method of claim 1, further comprising:
    determining that a lull in a conversation between the computer and the user has occurred; and
    generating a statement that is not a response to the user input based on the lull in the conversation; and
    outputting the statement to the user in a push manner.

7. The method of claim 1, wherein:
    the computer device receives the user input from a user device via a network; and
    the computer device outputs the response to the user device via the network.

8. The method of claim 1, wherein the context analysis includes determining one of an emotion of the user and an urgency of the user, the method further comprising:
    pushing, by the computer device, a question to the user when a predetermined level of the emotion or urgency is detected and when the user has been silent for a predetermined amount of time.

9. The method of claim 1, further keeping track, by the computer device, of and provide responses to questions of the user that have been previously asked but not yet answered by the computer device.

10. The method of claim 1, further comprising:
    determining, by the computer device, that certain ones of the likes, dislikes and opinions of the user are relevant to the user input based on the context data, wherein the certain ones of the likes, dislikes and opinions of the user comprise the filtered data, wherein the dynamically generating the personalized sentence is based on only the certain ones of the likes, dislikes and opinions of the user;
    determining, by the computer device, that a previous input of the user prior to the user input has not yet been responded to by the computer device;
    detecting, by the computer device, a lull in communication between the computer device and the user;
    generating, by the computer device, a personalized sentence as a response to the previous input of the user that has not yet been responded to by the computer device; and
    outputting, by the computer device, the response to the previous input of the user that has not yet been responded to by the computer device based on the detecting the lull in the communication between the computer and the user.

11. The method of claim 1, wherein the text fragments are further constructed based on:
    a date and time obtained from a user device of the user that provides the user input;
    a location obtained from the user device of the user that provides the input; and
    Internet data obtained via automated Internet search.

12. The method of claim 1, wherein the text fragments are constructed using natural language processing (NLP).

13. The method of claim 1, wherein the selecting one of the multiple personalized sentences as a response to the user input comprises utilizing heuristics and machine learning processes to select a single one of the multiple personalized sentences.

14. The method of claim 1, wherein the relevance of each of the insights to the user input is based on at least one of: a topic of a conversation; a time or date; a location; and contextual input of the user input.

15. The method of claim 1, wherein the context data comprises a mental state of the user, and the method further comprises automatically generating and providing another personalized sentence to the user based on the mental state of the user and not the user input.

16. The method of claim 1, further comprising:
    determining, by the computer device, parameters based on an ongoing conversation between the user and the computer device, the parameters including contextual information of the ongoing conversation and a type of output to be generated; and
    sending, by the computer device, the parameters to a statement and question framer of the computer device, wherein the response is based on the parameters.

17. The method of claim 1, further comprising determining context data based on context analysis of the user input, wherein the generating the text fragments is based on the context data.

18. The method of claim 17, wherein the context analysis includes determining one of an emotion of the user and an urgency of the user.

19. The method of claim 18, wherein the generating the text fragments is further based on external data selected from the group consisting of: weather data; news data; traffic data; location data from a mapping service; internet data; and inventory data.

20. The method of claim 19, wherein the filtering the insights obtained from the remote big data engine based on the relevance of each of the insights to the user input comprises:
    determining, by the computing device, that each insight in a subset of the insights has a relevance score higher than a threshold value, wherein the generating the text fragments is based on only the subset of the insights.

\* \* \* \* \*